United States Patent

[11] 3,548,143

| [72] | Inventor | Olaf Reeh<br>Adalbert-Stifter-Strasse 1, 8043, Munich-unterpfaffenhofen, Germany |
|---|---|---|
| [21] | Appl. No. | 783,684 |
| [22] | Filed | Dec. 13, 1968 |
| [45] | Patented | Dec. 15, 1970 |
| [32] | Priority | Dec. 19, 1967 |
| [33] | | Austria |
| [31] | | No. A11463/67 |

[54] WELDING TORCH
2 Claims, 3 Drawing Figs.

[52] U.S. Cl. .................................. 219/75,
219/74, 219/125
[51] Int. Cl. .................................. B23k 9/16,
B23k 9/12
[50] Field of Search .......................... 219/60,
60.1, 62, 74, 75, 124, 125, 137

[56] References Cited
UNITED STATES PATENTS

| 2,743,346 | 4/1956 | Scholl | 219/75 |
|---|---|---|---|
| 2,797,306 | 6/1957 | Qualey | 219/75 |
| 2,868,953 | 1/1959 | Gardner | 219/125 |
| 3,084,243 | 4/1963 | Gotch | 219/125 |
| 3,125,649 | 3/1964 | St. Cyr | 219/74 |
| 3,288,980 | 11/1966 | Rohrbergh et al. | 219/75 |

*Primary Examiner*—J. V. Truhe
*Assistant Examiner*—L. H. Bender
*Attorney*—John J. Dennemeyer

ABSTRACT: A nonfusible electrode is detachably mounted on a torch head. A tubular inert gas feed nozzle is detachably mounted on said torch head and surrounds said electrode and has a lateral gas outlet orifice. The electrode has a laterally bent tip protruding from the nozzle. The nozzle has a forward end wall formed with an aperture through which said electrode can be inserted into said nozzle.

PATENTED DEC 15 1970
3,548,143
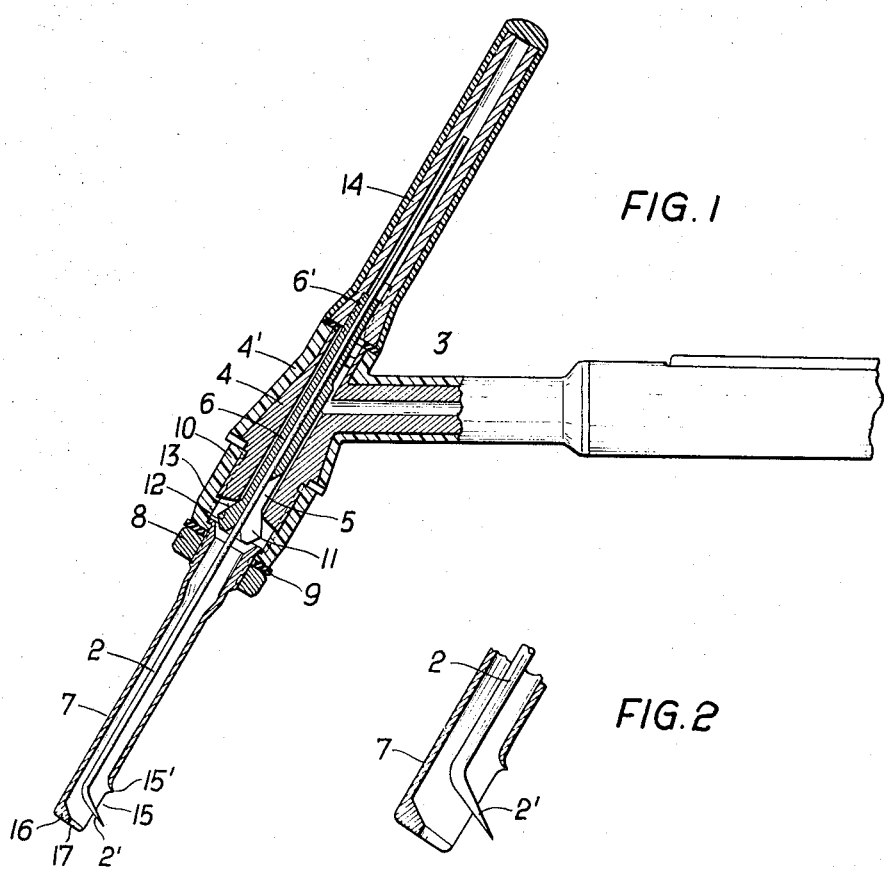
FIG.1
FIG.2
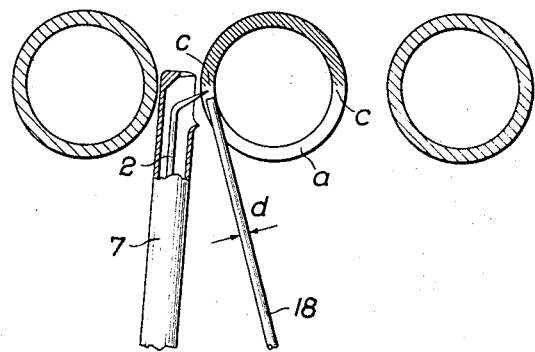
FIG.3

WELDING TORCH

Shielded-arc welding using the tungsten-arc inert gas process (TIG process) has found a wide field of application in the manufacture of boilers and apparatus. In many cases, however, said process cannot be adopted because the joints to be welded are not easily accessible so that a less desirable design or less desirable welding processes must be adopted. In boilers installed in large power plants, e.g., the steam-generating tubes are closely spaced one beside the other with a clearance of only 3 millimeters between the tubes to be joined and a distance of 15 millimeters between the tube walls, in order to ensure a high economy of the boiler. The closer the spacing of the tubes, the higher is the economy of the boiler. This economy depends on the selected tube diameter.

Such tubes have been joined by porefree welds produced by oxyacetylene welding although this process involves a considerable distortion of the tubes owing to the supply of a large amount of heat. The presence of high-pressure steam at high temperatures necessitates the use of tubes of materials which are highly alloyed for high-temperature strength. From the metallurgical aspect, it is much more desirable to weld these materials by the above-mentioned TIG process. The torch which is conventionally employed in this case, e.g., a torch according to the Austrian Pat. No. 207,212, comprises a nonfusible electrode, which is concentrically enclosed by the nozzle for supplying the inert gas. It is difficult, however, to introduce such nozzle into the small space between the tubes or tube walls. The gas stream emerging from the outlet of the nozzle results in the formation of subatmospheric pressures at the constricted welding site so that ambient air is sucked and enters the sheath of inert gas. Because the protection afforded by the gas is then impaired, pores may form in the weld. When the weld has been subjected to X-ray examination to detect defect joints, particularly porous portions, such portions must be removed (by chiseling) and must be formed one more in the required quality. This involves a considerable expenditure and loss of time.

The above-mentioned disadvantages will also be involved, for instance, when a container having a large flange is to be provided by a fillet seam with a short flanged connection pipe disposed beside the large flange. In this welding operation, the above-mentioned, undesirable injector action will also be encountered so that pores will form in the seam weld.

It is another object of the invention to enable a removal of the electrode without need for a removal of the nozzle in a welding torch having a nonfusible electrode which is shielded with inert gas and surrounded by a replaceable tubular inert gas feed nozzle, which is provided with a laterally opening outlet orifice for the inert gas near the laterally bent tip of the electrode. A standardized welding torch is to be used, which is suitable for normal manual welding as well as for automatic welding. According to the invention, this object is accomplished in that the nozzle is closed at its forward end by an end wall, which has an aperture, e.g., a slot, through which the electrode can be inserted.

In a special embodiment of said burner, the laterally bent tip of the electrode extends through the aperture of the nozzle. This arrangement will be particularly significant if fillet seams are to be welded in constricted spaces within tubes. It is also important that the nozzle of the welding torch according to the invention is adjustable and can be fixed in position so that the aperture angle between the aperture and the planes containing the axes of the torch handle and torch head can be selected as desired.

An embodiment of the welding torch according to the invention will now be explained more fully and by way of example with reference to the accompanying drawing. Whereas the latter shows an air-cooled torch, the invention may also be applied, e.g., to water-cooled torches, in which a nozzle designed according to the invention is connected to the torch head.

FIG. 1 shows the forward portion of the welding torch with the inert gas nozzle and a nonfusing electrode.

FIG. 2 is an enlarged view showing the forward part of the inert gas nozzle.

FIG. 3 shows how the welding torch according to the invention is held when welding vertical tubes.

In the FIGS. of the drawing, 1 designates a conventional collet for a nonfusing tungsten electrode 2. The inert gas and the welding current are supplied from supply lines in the tubular member 3 into the torch head 4, which is covered by insulation 4'. From the torch head, the gas flows through slots 5 into a screw-threaded member 6, which forms part of the collet and clamps the electrode 2 in position. The gas flows subsequently into a tubular nozzle 7, which is fixed by a nut 8 to the torch head, with a sealing ring 9 and a screw-threaded ceramic bushing 10 interposed. For clamping the electrode 2, a conical surface 12 of the slotted head 11 of the screw-threaded member 6 is drawn against a complementary surface 13 on the torch head 4. This is effected by a torch cap 14, which engages a screw-threaded rear extension 6' of the screw-threaded member 6.

The nozzle 7 consists, e.g., of a copper tube and has at its forward end a lateral outlet orifice 15, which has a beaded rim 15'. The end wall 16 of the nozzle is formed with an aperture 17, which is just so large that the electrode 2 can be inserted through said aperture into the collet 1. This mounting of the nozzle 7 enables the fixation of the nozzle at any desired angle to the plane which includes the axes of the torch handle and torch head.

In many cases it is sufficient to provide at the forward end of the nozzle 7 an oblique cut, through which at least part of the inert gas can flow laterally to the welding site and shield the same. It will be desirable, however, to use an electrode 2 which has a laterally bent forward end 2' extending through a nozzle orifice which has a more pronounced deflecting action on the gas than a nozzle having merely an oblique cut.

To enable a welding under an adequate gas shield between tubes which are spaced one beside the other (FIG. 3), a nozzle is used which has an oval forward portion leading to its orifice.

FIG. 3 shows the setup for making a welded joint, such as must be made in greatly differing attitudes in the manufacture of bent-tube boilers (Benson or Lamont). The clearance $a$ between the tubes to be joined is 3 millimeters. The filler wire 18 is also 3 millimeters in diameter $d$. The distance between the tube walls amounts to about 15 millimeters. Even under these conditions, which can still be considered as simple, the previously known nozzles do not enable a pore-free welding.

The placing of the root layer is begun between the tubes and a portion is carried approximately to the point $c$. The weld is then carried on the other side as far as to point $c$. An analogous procedure is performed on the opposite side. The seam weld is finally filled up by normal electrode welding. This technology ensures a proper placing of the root weld by the TIG process as well as the compliance with the metallurgical requirements of the tubular material in conjunction with a small supply of heat and a small thermal contraction.

I claim:

1. A welding torch comprising:
   a. a torch head;
   b. a non-fusing electrode detachably mounted on said torch head;
   c. a tubular inert gas feed nozzle detachably mounted on said torch head and surrounding said electrode and having a lateral gas outlet orifice;
   d. said electrode having a laterally bent tip protruding from said nozzle through said orifice; and
   e. said nozzle including a forward end wall, said forward end wall having an aperture slot therein through which said electrode can be inserted into said nozzle.

2. A welding torch as set forth in claim 1, which comprises:
   a torch handle having an axis and in which said torch head has an axis;
   said nozzle has a longitudinal axis and is mounted to be adjustable about its longitudinal axis to select a desired angle between said aperture and a plane containing the axes of said torch handle and torch head; and
   means are provided for fixing said nozzle in its adjusted position.